United States Patent
Tao

(10) Patent No.: US 12,556,101 B2
(45) Date of Patent: Feb. 17, 2026

(54) POWER SUPPLY TOPOLOGY, MOTOR DRIVE CONTROLLER, AND VEHICLE

(71) Applicant: Huawei Digital Power Technologies Co., Ltd., Shenzhen (CN)

(72) Inventor: Hong Tao, Xi'an (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 371 days.

(21) Appl. No.: 18/457,581

(22) Filed: Aug. 29, 2023

(65) Prior Publication Data

US 2023/0402926 A1 Dec. 14, 2023

Related U.S. Application Data

(63) Continuation of application No. PCT/CN2021/080233, filed on Mar. 11, 2021.

(51) Int. Cl.
*H02M 3/335* (2006.01)
*H02P 27/06* (2006.01)

(52) U.S. Cl.
CPC ........ *H02M 3/33507* (2013.01); *H02P 27/06* (2013.01)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561;
(Continued)

(56) References Cited

U.S. PATENT DOCUMENTS

| 7,952,892 B2 * | 5/2011 | Orr ........................ H02M 3/335 363/124 |
| 9,030,847 B2 * | 5/2015 | Shekhawat ....... H02M 3/33584 363/21.04 |

(Continued)

FOREIGN PATENT DOCUMENTS

| CN | 202696465 U | 1/2013 |
| CN | 207251512 U | 4/2018 |

(Continued)

*Primary Examiner* — Jeffrey A Gblende
(74) *Attorney, Agent, or Firm* — Maier & Maier, PLLC

(57) ABSTRACT

A power supply topology includes a first flyback power supply and a first forward power supply. The first flyback power supply is coupled to a first battery module and is configured to convert a first direct current output by the first battery module into a second direct current, where the second direct current is used to supply power to a lower bridge arm drive circuit in the motor drive controller. The first forward power supply is coupled to the first flyback power supply, and is configured to convert the second direct current into a third direct current, where the third direct current is used to supply power to an upper bridge arm drive circuit. The power supply topology is configured to supply power to the motor drive controller, thereby reducing a size of a transformer, and saving space of the whole vehicle.

20 Claims, 9 Drawing Sheets

(58) Field of Classification Search
CPC .. H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; H02M 5/2573; H02M 1/081; H02M 5/293; H02M 7/12; H02M 3/10; H02M 3/125; H02M 3/13; H02M 3/135; H02M 3/145; H02M 3/15; H02M 3/156; H02M 3/157; H02M 3/158; H02M 1/346; H02M 3/1588; H02M 2003/1566; H02M 3/1584; H02M 2003/1557; H02M 1/0032; H02M 1/4225; H02M 7/217; H02M 1/0025; H02M 1/0045; H02M 1/0009; H02M 1/088; Y02B 70/1491; G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H05B 39/048; B23K 11/24; H04B 2215/069

See application file for complete search history.

(56) References Cited

U.S. PATENT DOCUMENTS

| | | | |
|---|---|---|---|
| 10,164,544 B2* | 12/2018 | Ye | H02M 1/08 |
| 2012/0140529 A1* | 6/2012 | Jin | H02M 3/073 |
| | | | 363/16 |

FOREIGN PATENT DOCUMENTS

| | | | |
|---|---|---|---|
| CN | 207853783 U | 9/2018 | |
| CN | 109193852 A | 1/2019 | |
| CN | 208401757 U | 1/2019 | |
| CN | 110266245 A | 9/2019 | |
| JP | 2003299367 A | 10/2003 | |
| JP | 5901383 B2 | 4/2016 | |
| JP | 2017085895 A | 5/2017 | |

* cited by examiner

POWER SUPPLY TOPOLOGY, MOTOR DRIVE CONTROLLER, AND VEHICLE

CROSS-REFERENCE TO RELATED APPLICATIONS

This application is a continuation of International Application No. PCT/CN2021/080233, filed on Mar. 11, 2021, the disclosure of which is hereby incorporated by reference in its entirety.

TECHNICAL FIELD

The embodiments relate to the field of motor technologies and to a power supply topology, a motor drive controller, and a vehicle.

BACKGROUND

A motor drive controller is a core component of a power system of an electric vehicle. When the electric vehicle runs normally, the motor drive controller is used to convert a direct current output by a power battery into an alternating current to drive a motor to output torque, so as to drive the vehicle to run. When the electric vehicle slides or brakes, the motor operates in a power generation mode and converts kinetic energy into electric energy, and the motor drive controller is used to convert an alternating current output by the motor into a direct current, so as to charge the power battery.

In a conventional technology, a power supply topology of a three-phase motor drive controller may be shown in FIG. 1. A direct current/direct current (DC/DC) converter is used to perform DC/DC conversion on a direct current output by a low-voltage battery to convert a direct current at a low-voltage side into a direct current at a high-voltage side, thereby supplying power to the motor drive controller. Specifically, the power supply topology includes two DC/DC converters, where one DC/DC converter is used to supply power to a switching transistor in an upper bridge arm drive circuit in the motor drive controller, and the other DC/DC converter is used to supply power to a switching transistor in a lower bridge arm drive circuit in the motor drive controller.

In the foregoing power supply solution, both the upper bridge arm and the lower bridge arm need to be powered by a converter that performs high/low voltage conversion. In order to meet a requirement of safety regulation of a high/low voltage conversion transformer, some functional modules (including a pulse generation unit, a chopper unit, and the like) need to be disposed in the transformer, and consequently, the transformer is generally large in size. Therefore, the use of the power supply solution shown in FIG. 1 results in a large size of the transformer, which hinders space utilization of the whole vehicle.

In addition, when the solution shown in FIG. 1 is used, if the motor drive controller is a six-phase motor drive controller, two additional DC/DC converters need to be disposed for expansion into a power supply topology of the six-phase motor drive controller. Module expansion is difficult and occupies large space.

SUMMARY

Embodiments provide a power supply topology, a motor drive controller, and a vehicle, to supply power to the motor drive controller, thereby reducing a size of a transformer, and saving space of the whole vehicle.

According to a first aspect, an embodiment provides a power supply topology. The power supply topology is configured to supply power to a motor drive controller. The power supply topology includes a first flyback power supply and a first forward power supply. The first flyback power supply is coupled to a first battery module, and is configured to convert a first direct current output by the first battery module into a second direct current, where the second direct current is used to supply power to a lower bridge arm drive circuit in the motor drive controller. The first forward power supply is coupled to the first flyback power supply, and is configured to convert the second direct current into a third direct current, where the third direct current is used to supply power to an upper bridge arm drive circuit.

According to the foregoing solution, the power supply topology for supplying power to the motor drive controller includes a two-stage power supply architecture. The lower bridge arm drive circuit is powered by using a first-stage power supply (such as the first flyback power supply), and the upper bridge arm drive circuit is powered by using a second-stage power supply (such as the first forward power supply). The first flyback power supply needs to meet a basic insulation requirement for safety regulation, and the first forward power supply needs to meet a functional insulation requirement for safety regulation. Compared with the first flyback power supply, the first forward power supply has a lower insulation level requirement. In addition, because the first forward power supply does not require consideration of isolation between a high-voltage side and a low-voltage side, a size of the transformer in the first forward power supply is small. Compared with a solution in which both an upper bridge arm and a lower bridge arm drive circuit are powered by using DC/DC converters that perform high/low voltage conversion in the conventional technology, the power supply topology provided in the first aspect uses the two-stage power supply architecture, and the motor drive controller may be powered by using only one flyback power supply and one forward power supply. Therefore, the size of the transformer may be reduced, and a board size may be reduced, thereby saving space of the whole vehicle.

In an embodiment the power supply topology provided in the first aspect may further include a power supply management unit. The voltage supply management unit is coupled to the first flyback power supply or the first battery module, and is configured to supply power to a control circuit in the motor drive controller. The control circuit is configured to control the drive circuit.

According to the foregoing solution, the control circuit in the motor drive controller may be powered by using the first battery module.

In an embodiment, the power supply topology provided in the first aspect may further include a second flyback power supply. The second flyback power supply is coupled to a second battery module, and is configured to convert a fourth direct current output by the second battery module into a fifth direct current, where the fifth direct current is used to supply power to the lower bridge arm drive circuit.

The first battery module may be a battery, and the second battery module may be a power battery; or the first battery module may be a power battery, and the second battery module may be a battery.

According to the foregoing solution, backup of power supply to the lower bridge arm drive circuit may be implemented by using the first flyback power supply and the second flyback power supply.

Further, an output end of the first flyback power supply may be coupled to the lower bridge arm drive circuit through a first switching transistor, and an output end of the second flyback power supply may be coupled to the lower bridge arm drive circuit through a second switching transistor. The first switching transistor and the second switching transistor are not turned on at the same time.

The first switching transistor may be a diode or a metal-oxide-semiconductor field-effect transistor (MOSFET), and the second switching transistor may be a diode or a MOSFET.

According to the foregoing solution, backup of the power supply to the lower bridge arm drive circuit is implemented by controlling the first switching transistor and the second switching transistor to be turned on and off.

In an embodiment, the power supply management unit may be further coupled to the second flyback power supply or the second battery module. When the first battery module is a power battery and the second battery module is a battery, the power supply management unit is coupled to the first flyback power supply through a third switching transistor, the power supply management unit is coupled to the second battery module through a fourth switching transistor, and the third switching transistor and the fourth switching transistor are not turned on at the same time. Alternatively, when the first battery module is a battery and the second battery module is a power battery, the power supply management unit is coupled to the first battery module through a fifth switching transistor, the power supply management unit is coupled to the second flyback power supply through a sixth switching transistor, and the fifth switching transistor and the sixth switching transistor are not turned on at the same time.

According to the foregoing solution, backup of power supply to the control circuit may be implemented by controlling the third switching transistor and the fourth switching transistor to be turned on and off, or by controlling the fifth switching transistor and the sixth switching transistor to be turned on and off.

In an embodiment, the motor drive controller may be a three-phase motor drive controller or a multi-phase motor drive controller.

In an embodiment, the power supply topology provided in the first aspect may further include a second forward power supply. The second forward power supply is coupled to the first flyback power supply, and is configured to convert the second direct current into a sixth direct current, where the sixth direct current is used to supply power to the upper bridge arm drive circuit.

According to the foregoing solution, when the motor drive controller is a multi-phase motor drive controller, the first forward power supply and the second forward power supply may jointly supply power to the upper bridge arm drive circuit. If the motor drive controller is a six-phase motor drive controller, one three-phase upper bridge arm drive circuit may be powered by using the first forward power supply, and the other three-phase upper bridge arm drive circuits may be powered by using the second forward power supply.

According to a second aspect, an embodiment further provides a motor drive controller. The motor drive controller includes a drive circuit, a control circuit, and the power supply topology provided in the first aspect and any one of the possible embodiments or implementations of the first aspect. The power supply topology is configured to supply power to the drive circuit and the control circuit.

According to a third aspect, an embodiment further provides a vehicle. The vehicle includes a power battery, a motor, and the motor drive controller provided in the second aspect. The motor drive controller is configured to convert a direct current output by the power battery into an alternating current, where the alternating current is used to drive the motor. Alternatively, the motor drive controller is configured to convert an alternating current output by the motor into a direct current, where the direct current is used to charge the power battery.

In addition, it should be understood that for effects brought by the second aspect, the third aspect, and any one of possible implementations or embodiments thereof, refer to effects brought by different implementations or embodiments of the first aspect. Details are not described herein again.

DETAILED DESCRIPTION OF EMBODIMENTS

The following further describes in detail various embodiments with reference to the accompanying drawings.

It should be noted that "a plurality of" in embodiments means two or more than two. In addition, in the descriptions, terms such as "first" and "second" are merely used for distinction and description, and shall not be understood as an indication or implication of relative importance or an indication or implication of an order. "Coupled" mentioned in embodiments refers to "electrically connected", and may include two manners: a direct connection and an indirect connection.

An embodiment provides a power supply topology. The power supply topology is configured to supply power to a motor drive controller. The power supply topology may be integrated in a chip of the motor drive controller, or may be used as an independent module.

Figure 2:
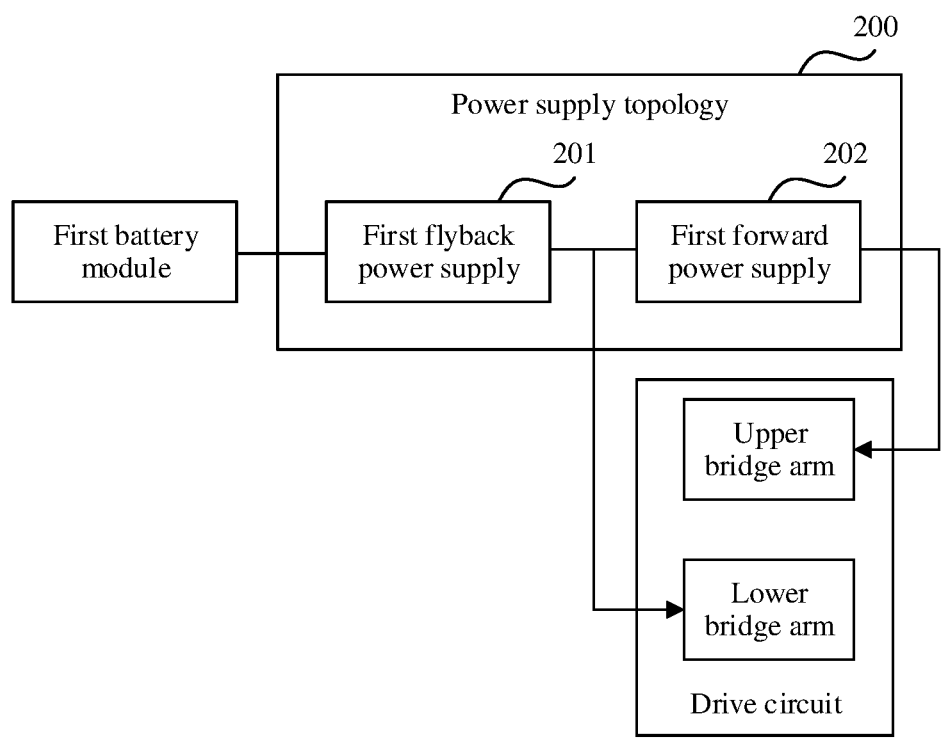
FIG. 2 is a schematic diagram of a structure of a first power supply topology according to an embodiment.

As shown in FIG. 2, the power supply topology 200 includes a first flyback power supply 201 and a first forward power supply 202. The first flyback power supply 201 is coupled to a first battery module, and is configured to convert a first direct current output by the first battery module into a second direct current, where the second direct current is used to supply power to a lower bridge arm drive circuit in the motor drive controller. The first forward power supply 202 is coupled to the first flyback power supply 201, and is configured to convert the second direct current into a third direct current, where the third direct current is used to supply power to an upper bridge arm drive circuit.

Both the flyback power supply and the forward power supply may be considered as DC/DC converters. A difference lies in that the flyback power supply uses a flyback high-frequency transformer to implement isolation between an output loop and an input loop. When the input loop is at a low voltage and the output loop is at a high voltage, or the input loop is at a high voltage and the output loop is at a low voltage, a low-voltage side circuit and a high-voltage side circuit can be isolated by using an isolation function of the flyback power supply. The forward power supply does not have a function of isolating an input loop from an output loop, however, an output voltage has good transient and load features.

In actual application, the flyback power supply may be configured to implement isolation between a high-voltage side and a low-voltage side. Therefore, there is a high requirement for safety regulation on the flyback power supply. To meet the safety regulation requirement, some functional modules (such as a wave-sending controller) need to be configured in the flyback power supply. Therefore, a transformer of the flyback power supply is large. The forward power supply does not require isolation between high and low voltages. Therefore, a safety regulation requirement is low, and a size of a transformer is small.

In this embodiment, the motor drive controller may be a three-phase motor drive controller, or may be a multi-phase (such as six-phase or nine-phase) motor drive controller. For example, the motor drive controller can include a control circuit, the drive circuit, and a power conversion unit.

The control circuit may be considered as a processor, for example, may be a central processing unit (CPU), and is configured to send a control instruction, where the control instruction sent by the control circuit is used to control the drive circuit to drive the power conversion unit, thereby implementing a function of the motor drive controller.

The drive circuit is a bridge drive circuit, for example, may be a three-phase full-bridge drive circuit, a three-phase half-bridge drive circuit, or a six-phase bridge drive circuit. The bridge drive circuit includes an upper bridge arm and a lower bridge arm. For a specific structure of the drive circuit, refer to descriptions in a conventional technology. Details are not described herein.

The power conversion unit is configured to implement a function of the motor drive controller under driving of the drive circuit. For example, the power conversion unit is configured to perform DC/AC (alternating current) conversion on a direct current output by a power battery, and an alternating current output by the power conversion unit is used to drive a motor to drive a vehicle to run. For another example, the power conversion unit is configured to perform AC/DC conversion on an alternating current output by the motor, and a direct current output by the power conversion unit is used to charge the power battery. For a specific structure of the power conversion unit, refer to descriptions in a conventional technology. Details are not described herein.

In the motor drive controller, the control circuit belongs to the low-voltage side, an input end of the drive circuit belongs to the low-voltage side, the output end of the drive circuit belongs to the high-voltage side, and the power conversion unit belongs to the high-voltage side. Therefore, when the motor drive controller is powered, isolation between the high-voltage side and the low-voltage side needs to be considered. For example, the control circuit needs to be powered at the low-voltage side, and the drive circuit needs to be powered at the high-voltage side.

In this embodiment, the first flyback power supply 201 may convert the first direct current into the second direct current at the high-voltage side, to supply power to the lower bridge arm drive circuit. Because the second direct current is located at the high-voltage side, when the second direct current is converted into the third direct current to supply power to the upper bridge arm drive circuit, isolation between the high-voltage side and the low-voltage side does not need to be considered, and conversion from the second direct current to the third direct current can be implemented by using the first forward power supply.

In this embodiment, the power supply topology 200 for supplying power to the motor drive controller includes a two-stage power supply architecture. The lower bridge arm drive circuit is powered by a first-stage power supply (such as the first flyback power supply 201), and the upper bridge arm drive circuit is powered by a second-stage power supply (such as the first forward power supply 202). The first flyback power supply 201 needs to meet basic insulation in the safety regulation requirement, and the first forward power supply 202 needs to meet functional insulation in the safety regulation requirement. Compared with the first flyback power supply 201, the first forward power supply 202 has a lower insulation level requirement. In addition, because the first forward power supply 202 does not need to require consideration of isolation between the high-voltage side and the low-voltage side, a size of a transformer in the first forward power supply 202 is small. Compared with a solution in which both an upper bridge arm and a lower bridge arm drive circuit are powered by using DC/DC converters that perform high/low voltage conversion in a conventional technology, the power supply topology 200 provided in this embodiment uses the two-stage power supply architecture, and the motor drive controller may be powered by using only one flyback power supply and one forward power supply. Therefore, the size of the transformer may be reduced, and a board size may be reduced, thereby saving space of the whole vehicle.

In addition, because a safety regulation requirement on the forward power supply is lower than that of the flyback power supply, the foregoing two-stage power supply architecture can alleviate a constraint of safety regulation on a circuit, and improve reliability of a system. In addition, because only the lower bridge arm drive circuit is powered by using the flyback power supply, compared with a solution in which both an upper bridge arm and a lower bridge arm are powered by using flyback power supplies in the conventional technology, coupling paths on the high-voltage side and the low-voltage side are reduced. This helps improve electromagnetic compatibility (EMC) of the system.

Figure 3:
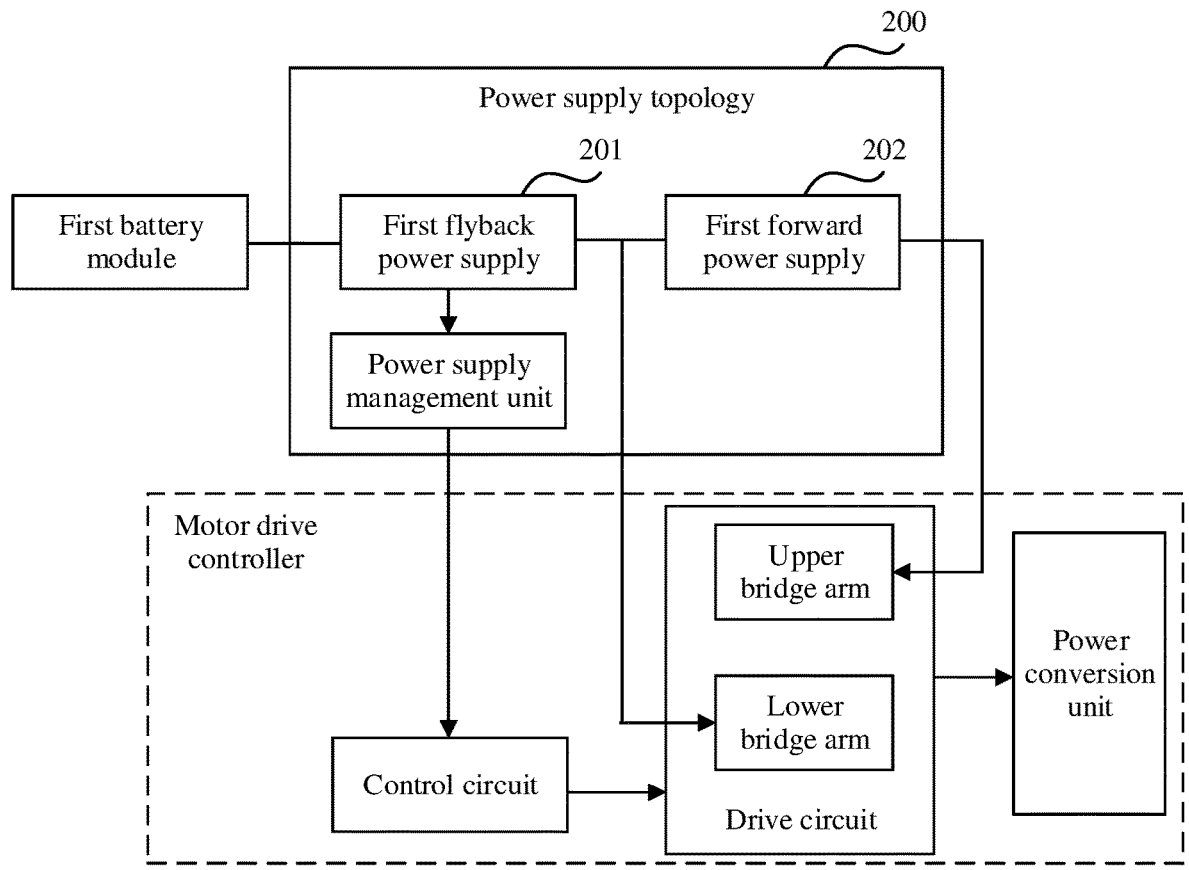
FIG. 3 is a schematic diagram of a structure of a second power supply topology according to an embodiment.

The power supply topology 200 may further include a power supply management unit. As shown in FIG. 3, the power supply management unit is coupled to the first flyback power supply 201 or the first battery module (in FIG. 3, an example in which the power supply management unit is coupled to the first flyback power supply 201 is used for illustration). The power supply management unit is configured to supply power to the control circuit in the motor drive controller. The control circuit is configured to control the drive circuit, so as to drive the power conversion unit to implement a function of the motor drive controller.

In actual application, two battery modules may be configured in an electric vehicle: a low-voltage battery and a high-voltage power battery. In various embodiments, the low-voltage battery may be a lead acid battery, and the high-voltage power battery may be a lithium battery.

In this embodiment, the first battery module may be a battery, or may be a power battery. Because the control circuit is powered at the low-voltage side, and the power supply management unit is also located at the low-voltage side, when the first battery module is a low-voltage battery, the power supply management unit may be directly coupled to the first battery module, so as to supply power to the control circuit by using a low-voltage direct current output by the first battery module. When the first battery module is a high-voltage power battery, the power supply management unit is not directly coupled to the first battery module, but is coupled to the first flyback power supply 201, and the first flyback power supply 201 converts an output of the power battery into a low-voltage side, and then outputs the output to the power supply management unit.

It is not difficult to understand from the foregoing description that, in the power supply topology 200, the first-stage power supply (such as the first flyback power supply 201) uses the flyback power supply for the following reasons: 1. If the first battery module is a low-voltage battery, the flyback power supply needs to convert the low-voltage direct current output by the low-voltage battery into a high-voltage side, so as to supply power to the lower bridge arm drive circuit. 2. If the first battery module is a high-voltage power battery, an output of the first-stage power supply is further used to supply power to the power supply management unit at the low-voltage side. Therefore, a high-voltage direct current output by the high-voltage power battery needs to be converted into a low-voltage side by using the flyback power supply, so as to supply power to the power supply management unit.

Figure 4:
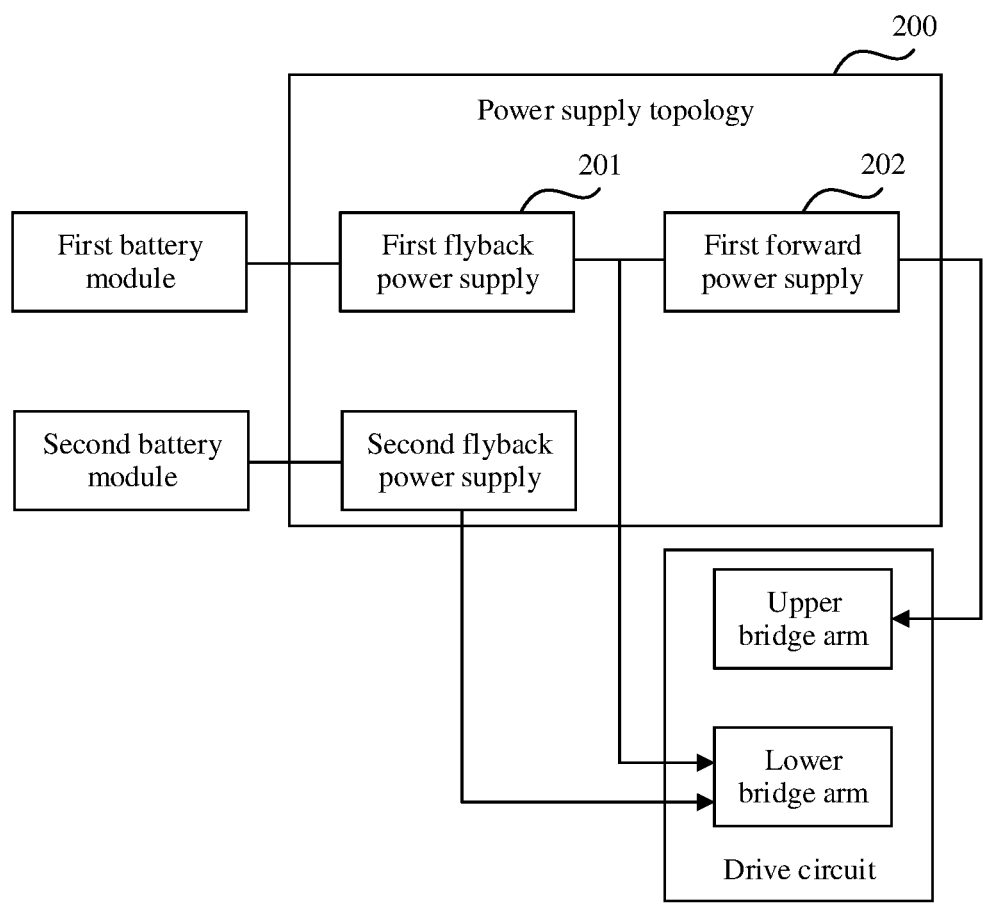
FIG. 4 is a schematic diagram of a structure of a third power supply topology according to an embodiment.

In addition, the power supply topology 200 may further include a second flyback power supply. As shown in FIG. 4, the second flyback power supply is coupled to the second battery module, and is configured to convert a fourth direct current output by the second battery module into a fifth direct current, where the fifth direct current is used to supply power to the lower bridge arm drive circuit, so as to implement backup of power supply to the lower bridge arm.

For example, an output end of the first flyback power supply 201 described above may be coupled to the lower bridge arm drive circuit through a first switching transistor, an output end of the second flyback power supply may be coupled to the lower bridge arm drive circuit through a second switching transistor, and the first switching transistor and the second switching transistor are not turned on at the same time.

In this embodiment, the switching transistor may be a diode, or may be a metal-oxide-semiconductor field-effect transistor (MOSFET), a gallium nitride (GaN) transistor, an insulated gate bipolar transistor (IGBT), a bipolar junction transistor (BJT), or the like. A specific type of the switching transistor is not limited in this embodiment.

The first switching transistor and the second switching transistor are not turned on at the same time. In other words, when the lower bridge arm drive circuit is powered, power is supplied by the first battery module and the first flyback power supply 201, or power is supplied by the second battery module and the second flyback power supply, so as to implement backup of power supply to the lower bridge arm: When the first switching transistor is turned on, the first direct current output by the first battery module is converted into the second direct current by using the first flyback power supply 201 to supply power to the lower bridge arm drive circuit. When the second switching transistor is turned on, the fourth direct current output by the second battery module is converted into the fifth direct current by using the second flyback power supply to supply power to the lower bridge arm drive circuit. Therefore, when a battery module or a flyback power supply is faulty, power supply to the lower bridge arm may be still implemented.

As described above, two battery modules may be configured in the electric vehicle: a low-voltage battery and a high-voltage power battery. Therefore, in the power supply topology 200 shown in FIG. 4, if the first battery module is a battery, the second battery module is a power battery; or if the first battery module is a power battery, the second battery module is a battery.

Further, when the power supply topology 200 includes the second flyback power supply, the power supply management unit described above may be further coupled to the second flyback power supply or the second battery module to implement backup of power supply to the control circuit.

In one implementation, if the first battery module is a power battery and the second battery module is a battery, the power supply management unit may be coupled to the first flyback power supply 201 through a third switching transistor, and is configured to receive a low-voltage direct current that is output by the first battery module and that is obtained through conversion by the first flyback power supply 201. In addition, the power supply management unit may be coupled to the second battery module through a fourth switching transistor, and is configured to receive a low-voltage direct current output by the second battery module. The third switching transistor and the fourth switching transistor are not turned on at the same time, so as to implement backup of power supply to the control circuit. When the third switching transistor is turned on, the first battery module supplies power to the power supply management unit by using the first flyback power supply 201, so as to supply power to the control circuit. When the fourth switching transistor is turned on, the second battery module supplies power to the power supply management unit, so as to supply power to the control circuit.

In another implementation, if the first battery module is a battery and the second battery module is a power battery, the power supply management unit may be coupled to the first battery module through a fifth switching transistor, and is configured to receive a low-voltage direct current output by the first battery module. In addition, the power supply management unit may be coupled to the second flyback power supply through a sixth switching transistor, and is configured to receive a low-voltage direct current that is output by the second flyback power supply and that is obtained through conversion by the second battery module. The fifth switching transistor and the sixth switching transistor are not turned on at the same time, so as to implement backup of power supply to the control circuit. When the fifth switching transistor is turned on, the first battery module supplies power to the power supply management unit, so as to supply power to the control circuit. When the sixth switching transistor is turned on, the second battery module supplies power to the power supply management unit by using the second flyback power supply, so as to supply power to the control circuit.

In this embodiment, the motor drive controller may be a three-phase motor drive controller, or may be a multi-phase motor drive controller. For example, if the motor drive controller is a three-phase motor drive controller, the drive circuit includes a three-phase upper bridge arm and a three-phase lower bridge arm; if the motor drive controller is a six-phase motor drive controller, the drive circuit includes a six-phase upper bridge arm and a six-phase lower bridge arm; if the motor drive controller is a nine-phase motor drive controller, the drive circuit includes a nine-phase upper bridge arm and a nine-phase lower bridge arm; and so on.

If the motor drive controller is the three-phase motor drive controller, the three-phase lower bridge arm drive circuit may be powered by using the first flyback power supply 201, and the three-phase upper bridge arm drive circuit may be powered by using the first forward power supply 202.

Figure 5:
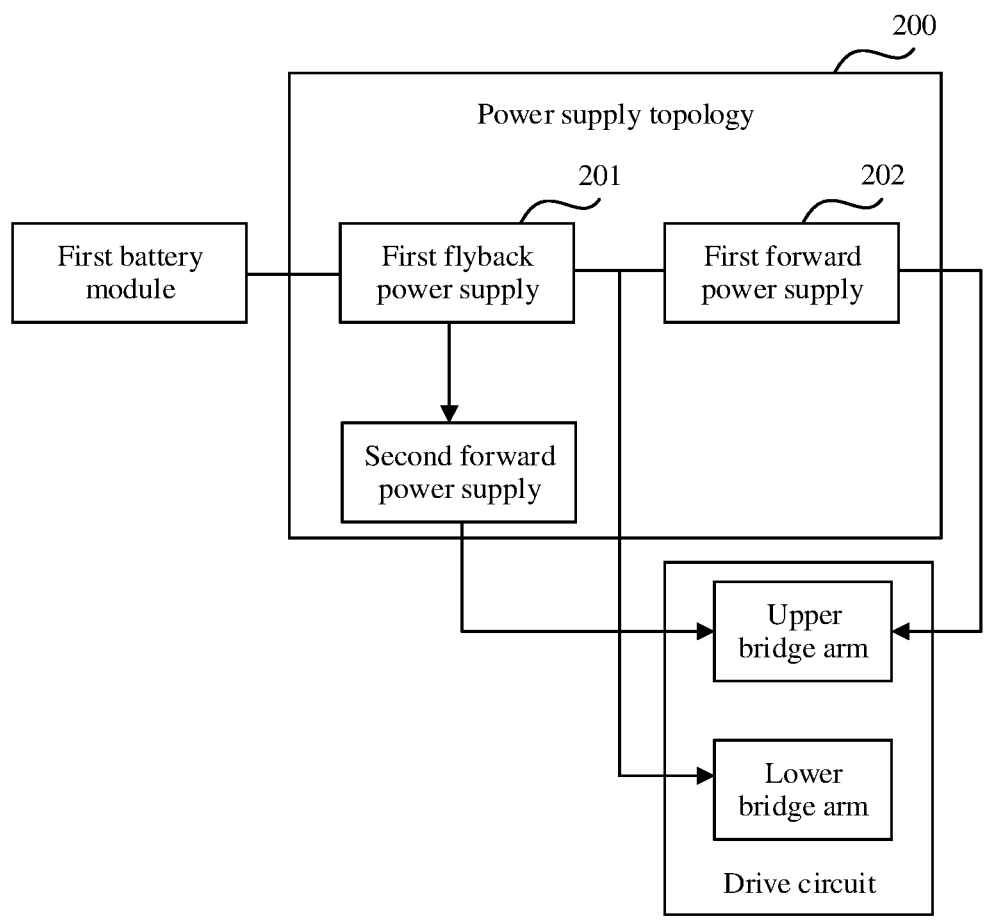
FIG. 5 is a schematic diagram of a structure of a fourth power supply topology according to an embodiment.

If the motor drive controller is the six-phase motor drive controller, in one implementation, the six-phase lower bridge arm drive circuit may be powered by using the first flyback power supply 201, and the six-phase upper bridge arm drive circuit may be powered by using the first forward power supply 202. In another implementation, as shown in FIG. 5, the power supply topology 200 may further include a second forward power supply. The second forward power supply is coupled to the first flyback power supply 201, and is configured to convert the second direct current into a sixth direct current, where the sixth direct current is used to supply power to the upper bridge arm drive circuit. Because lower bridge arms of the drive circuit may be common-grounded, only a quantity of second-stage forward power supplies needs to be expanded to meet a requirement of upper bridge driving. For example, the six-phase lower bridge arm drive circuit may be powered by the first flyback power supply 201, the three-phase upper bridge arm drive circuit may be powered by the first forward power supply 202, and the other three-phase upper bridge arm drive circuit may be powered by the second forward power supply.

Further, if the motor drive controller is the nine-phase motor drive controller, the power supply topology 200 may further include a third forward power supply. Nine-phase lower bridge arms of the drive circuit are common-grounded, and may be powered by using the first flyback power supply 201. One of three-phase upper bridge arm drive circuits may be powered by using the first forward power supply 202, another of three-phase upper bridge arm drive circuits may be powered by using the second forward power supply, and the remaining one of three-phase upper bridge arm drive circuits may be powered by using the third forward power supply.

Thus, when the motor drive controller is a multi-phase motor drive controller, the second forward power supply may be added to the power supply topology 200, so as to expand the power supply topology 200 to adapt to a scenario of the multi-phase motor drive controller.

Figure 1:
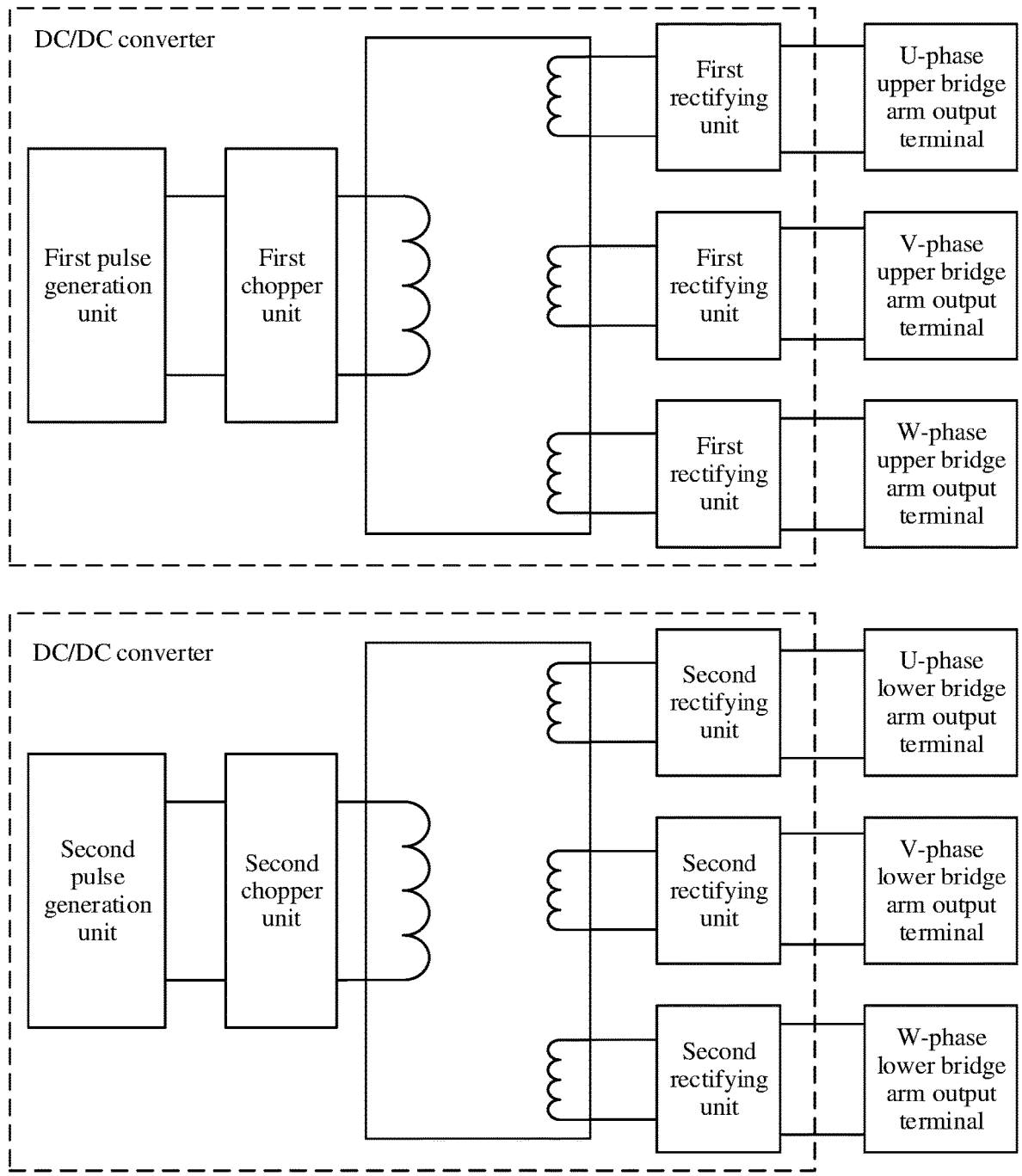
FIG. 1 is a schematic diagram of a power supply topology for supplying power to a motor drive controller according to a conventional technology.

In the current technology solution shown in FIG. 1, if adaptation of a multi-phase motor drive controller is required, two additional DC/DC converters need to be added to supply power to the three-phase upper bridge arm and the three-phase lower bridge arm, respectively, which greatly changes the power supply topology. In addition, the added DC/DC converters also need to meet isolation between an input side and an output side, and a size of the transformer is large.

In this embodiment, however, only one forward power supply needs to be added, to adapt to the multi-phase motor drive controller, which slightly changes the power supply topology. In addition, the added forward power supply does not require isolation between an output circuit and an input circuit. Therefore, the size of the transformer is small, thereby reducing a board size, reducing board costs, and saving space of the whole vehicle.

Therefore, the power supply topology 200 provided in this embodiment includes a two-stage power supply architecture. The lower bridge arm drive circuit is powered by a first-stage power supply (such as the first flyback power supply 201), and the upper bridge arm drive circuit is powered by a second-stage power supply (such as the first forward power supply 202). Because the first forward power supply 202 does not require consideration of isolation between the high-voltage side and the low-voltage side, the size of the transformer in the first forward power supply 202 is small. Compared with a solution in which both an upper bridge arm and a lower bridge arm drive circuit are powered by using a converter that performs high/low voltage conversion in a conventional technology, in the power supply topology 200, the motor drive controller may be powered by using only one flyback power supply and one forward power supply. Therefore, the size of the transformer may be reduced, a board size may be reduced, thereby saving space of the whole vehicle.

For ease of understanding, the following describes the power supply topology 200 provided in this embodiment by using three examples. It should be noted that, in the following three examples, an example in which the power supply topology 200 is integrated into the motor drive controller is used for illustration. A case in which the power supply topology 200 is used as an independent module is not described.

Example 1

Figure 6:
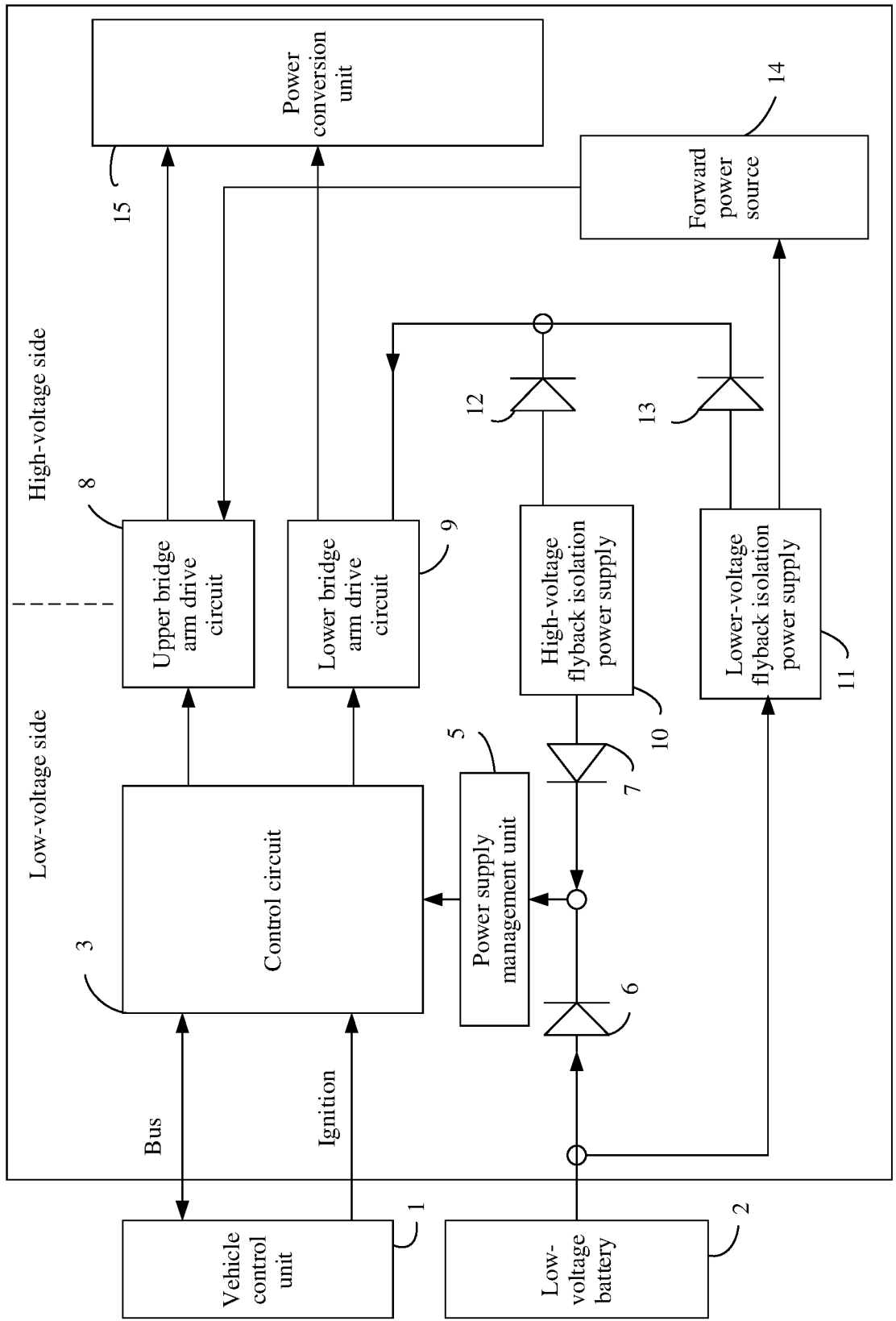
FIG. 6 is a schematic diagram of a structure of a first motor drive controller according to an embodiment.

In Example 1, as shown in FIG. 6, a motor drive controller includes three DC/DC circuits (10/11/14), two drive circuits (an upper bridge arm drive circuit 8/a lower bridge arm drive circuit 9), one control circuit (3), one power supply management unit (5), a power conversion unit (15), and four power supply ORING circuits (ORING diodes or MOSFET transistors 6/7/12/13).

The three DC/DC circuits are: a high-voltage flyback isolation power supply 10, which performs DC/DC conversion on a direct current output by a high-voltage power battery (not shown in FIG. 6), so as to supply power to the control circuit 3 at a low-voltage side and the lower bridge arm drive circuit 9 at a high-voltage side; a low-voltage flyback isolation power supply 11, which performs DC/DC conversion on a direct current (for example, 5 V or 12 V) output by a low-voltage battery, so as to supply power to the lower bridge arm drive circuit 9 at the high-voltage side and a forward power supply 14; and the forward power supply 14, which performs DC/DC conversion on a direct current output by a low-voltage flyback isolation power supply 11, so as to supply power to the upper bridge arm drive circuit 8.

In Example 1, the control circuit 3 has two power supplies, the low-voltage battery 2 and the high-voltage flyback isolation power supply 10 (a power supply is selected by using the ORING circuits 6/7), so as to implement power supply backup. The lower bridge arm drive circuit 9 has two power supplies, such as the high-voltage flyback isolation power supply 10 and the low-voltage flyback isolation power supply 11 (a power supply is selected by using the ORING circuits 12/13), so as to implement power supply backup. A power supply of the upper bridge arm drive circuit 8 is the forward power supply 14.

Example 2

Figure 7:
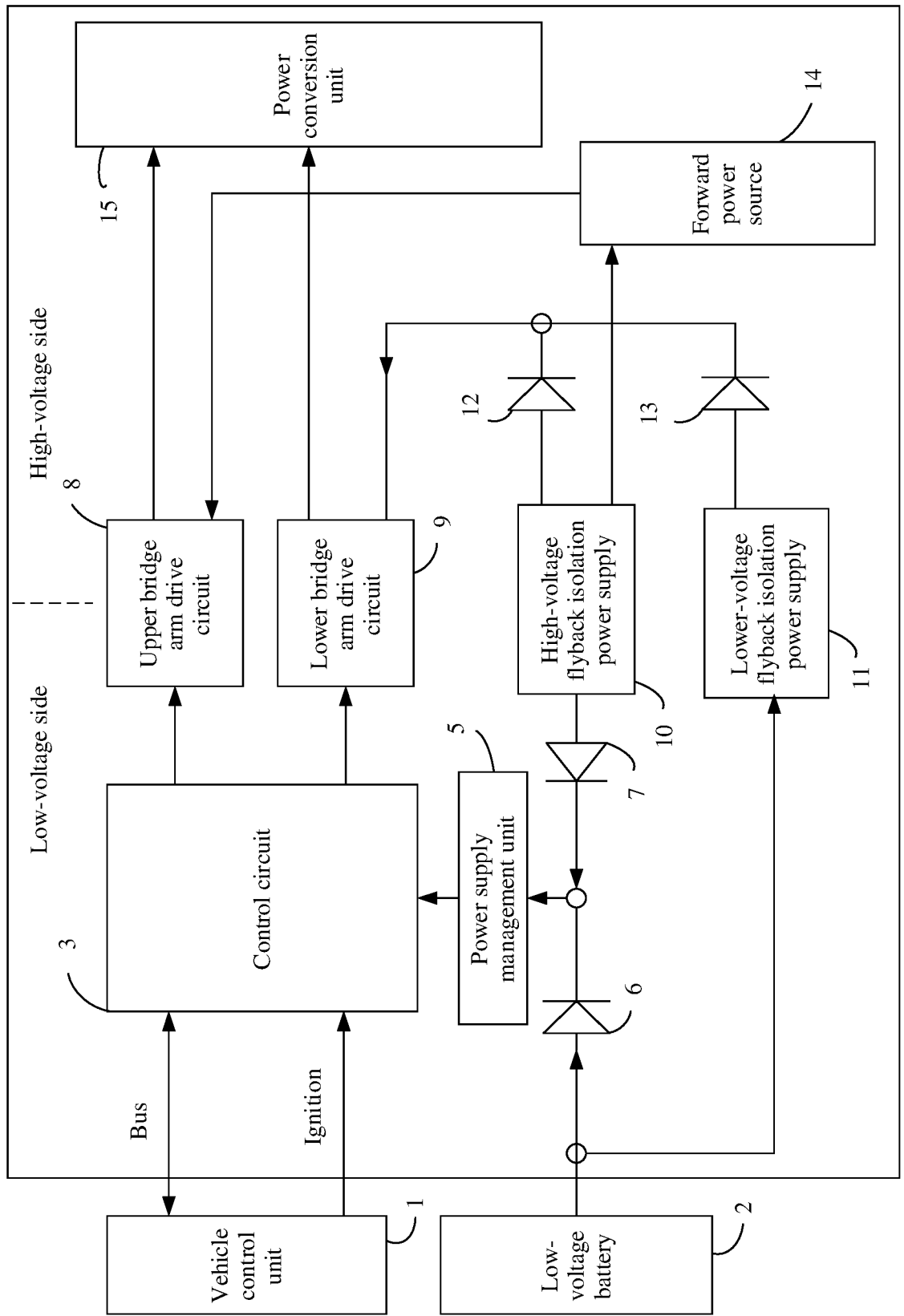
FIG. 7 is a schematic diagram of a structure of a second motor drive controller according to an embodiment.

In Example 2, as shown in FIG. 7, a motor drive controller includes three DC/DC circuits (10/11/14), two drive circuits (an upper bridge arm drive circuit 8/a lower bridge arm drive circuit 9), one control circuit (3), one power supply management unit (5), a power conversion unit (15), and four power supply ORING circuits (ORING diodes or MOSFET transistors 6/7/12/13).

The three DC/DC circuits are: a high-voltage flyback isolation power supply 10, which performs DC/DC conversion on a direct current output by a high-voltage power battery, so as to supply power to the control circuit 3 at a low-voltage side and the lower bridge arm drive circuit 9 at a high-voltage side; a low-voltage flyback isolation power supply 11, which performs DC/DC conversion on a direct current (for example, 5 V or 12 V) output by a low-voltage battery, so as to supply power to the lower bridge arm drive circuit 9 at the high-voltage side and a forward power supply 14; and the forward power supply 14, which performs DC/DC conversion on a direct current output by the flyback isolation power supply so as to supply power to the upper bridge arm drive circuit 8.

In Example 2, the control circuit 3 has two power supplies, the low-voltage battery 2 and the high-voltage flyback isolation power supply 10 (a power supply is selected by using the ORING circuits 6/7), so as to implement power supply backup. The lower bridge arm drive circuit 9 has two power supplies, such as the high-voltage flyback isolation power supply 10 and the low-voltage flyback isolation power supply 11 (a power supply is selected by using the ORING circuits 12/13), so as to implement power supply backup. A power supply of the upper bridge arm drive circuit 8 is the forward power supply 14.

Example 3

Figure 8:
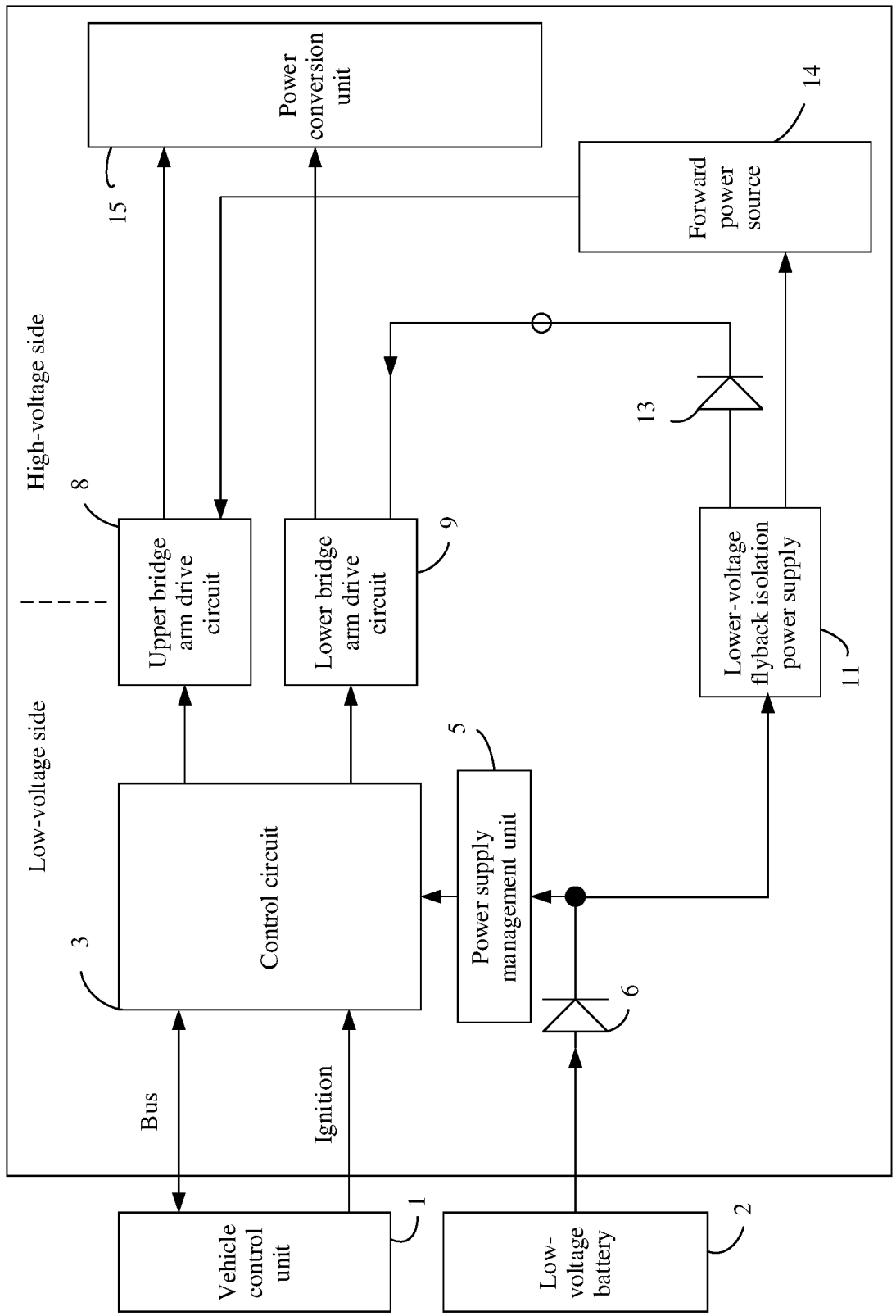
FIG. 8 is a schematic diagram of a structure of a third motor drive controller according to an embodiment.

In Example 3, as shown in FIG. 8, the motor drive controller includes two DC/DC circuits (11/14), two drive circuits (an upper bridge arm drive circuit 8/a lower bridge arm drive circuit 9), one control circuit (3), one power supply management unit (5), a power conversion unit (15), and two power supply ORING circuits (ORING diodes or MOSFET transistors 6/13).

The two DC/DC circuits are: a low-voltage flyback isolation power supply 11, which performs DC/DC conversion on a direct current (for example, 5 V or 12 V) output by a low-voltage battery, so as to supply power to the lower bridge arm drive circuit 9 at a high-voltage side and a forward power supply 14; and the forward power supply 14, which performs DC/DC conversion on a direct current output by a low-voltage flyback isolation power supply 11, so as to supply power to the upper bridge arm drive circuit 8.

In Example 3, power supplies of the control circuit 3 are a low-voltage battery 2 and a low-voltage flyback isolation power supply 11, a power supply of the lower bridge arm drive circuit 9 is the low-voltage flyback isolation power supply 11, and a power supply of the upper bridge arm drive circuit 8 is the forward power supply 14. In Example 3, the ORING circuits 6/13 have a function of preventing reverse breakdown.

Figure 9:
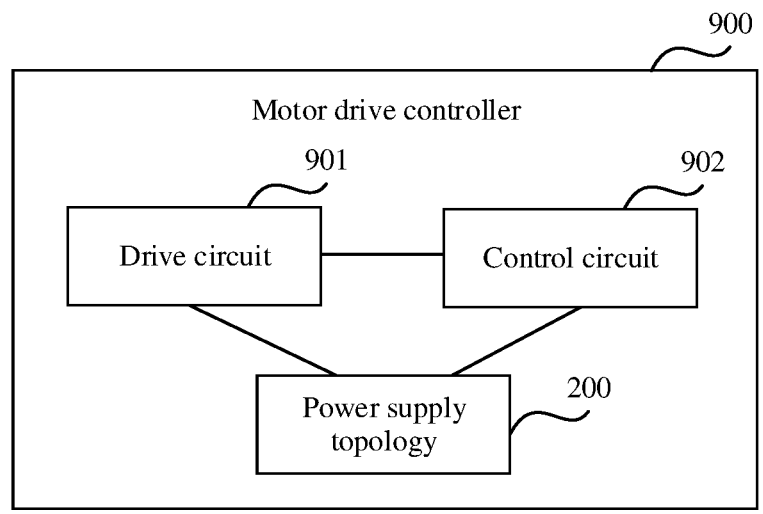
FIG. 9 is a schematic diagram of a structure of a fourth motor drive controller according to an embodiment.

In addition, an embodiment further provides a motor drive controller. As shown in FIG. 9, the motor drive controller 900 includes a drive circuit 901, a control circuit 902, and the foregoing power supply topology 200, and the power supply topology 200 is configured to supply power to the drive circuit 901 and the control circuit 902.

It should be noted that, for an implementation and an effect of the motor drive controller 900 that are not described in detail, refer to related descriptions of the foregoing power supply topology 200. Details are not described herein again.

Figure 10:
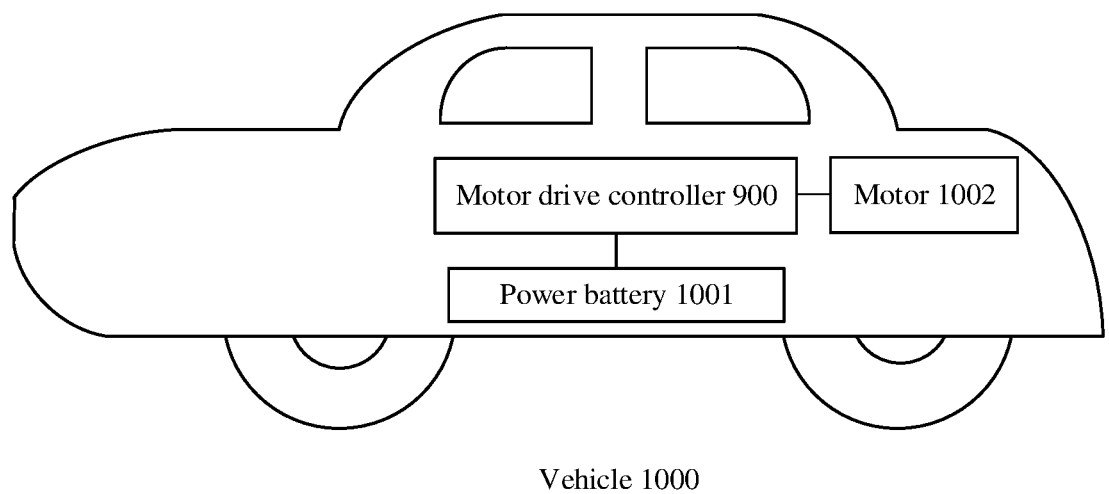
FIG. 10 is a schematic diagram of a structure of a vehicle according to an embodiment.

In addition, an embodiment further provides a vehicle. As shown in FIG. 10, the vehicle 1000 includes a power battery 1001, a motor 1002, and the motor drive controller 900. The motor drive controller 900 is configured to convert a direct current output by the power battery 1001 into an alternating current, where the alternating current is used to drive the motor 1002. Alternatively, the motor drive controller 900 is configured to convert an alternating current output by the motor 1002 into a direct current, where the direct current is used to charge the power battery 1001.

It is clear that a person skilled in the art can make various modifications and variations to embodiments without departing from their scope, is the embodiments are intended to cover these modifications and variations.

What is claimed is:

1. A power supply topology, wherein the power supply topology is configured to supply power to a motor drive controller, and the power supply topology comprises:
    a first flyback power supply coupled to a first battery module, the first flyback power supply configured to convert a first direct current output by the first battery module into a second direct current, wherein the second direct current is used to supply power to a lower bridge arm drive circuit in the motor drive controller; and
    a first forward power supply coupled to the first flyback power supply, the first forward power supply configured to convert the second direct current into a third direct current, wherein the third direct current is used to supply power to an upper bridge arm drive circuit.

2. The power supply topology according to claim 1, further comprising:
    a power supply management unit coupled to the first flyback power supply or the first battery module, the power supply management unit configured to supply power to a control circuit in the motor drive controller, wherein the control circuit is configured to control the drive circuit.

3. The power supply topology according to claim 1, further comprising:
    a second flyback power supply coupled to a second battery module, the second flyback power supply configured to convert a fourth direct current output by the second battery module into a fifth direct current, wherein the fifth direct current is used to supply power to the lower bridge arm drive circuit.

4. The power supply topology according to claim 3, wherein an output end of the first flyback power supply is coupled to the lower bridge arm drive circuit through a first switching transistor, and an output end of the second flyback power supply is coupled to the lower bridge arm drive circuit through a second switching transistor; and the first switching transistor and the second switching transistor are not turned on at the same time.

5. The power supply topology according to claim 3, wherein the power supply management unit is coupled to the second flyback power supply or the second battery module, wherein
    the power supply management unit is coupled to the first flyback power supply through a third switching transistor, the power supply management unit is coupled to the second battery module through a fourth switching transistor, and the third switching transistor and the fourth switching transistor are not turned on at the same time; or the power supply management unit is coupled to the first battery module through a fifth switching transistor, the power supply management unit is coupled to the second flyback power supply through a sixth switching transistor, and the fifth switching transistor and the sixth switching transistor are not turned on at the same time.

6. The power supply topology according to claim 4, wherein the first switching transistor is a diode or a metal-oxide-semiconductor field-effect transistor (MOSFET), and the second switching transistor is a diode or a MOSFET.

7. The power supply topology according to claim 3, wherein the first battery module is a battery and the second battery module is a power battery; or the first battery module is a power battery and the second battery module is a battery.

8. The power supply topology according to claim 1, wherein the motor drive controller is a three-phase motor drive controller or a multi-phase motor drive controller.

9. The power supply topology according to claim 1, further comprising:
a second forward power supply coupled to the first flyback power supply, the second forward power supply configured to convert the second direct current into a sixth direct current, wherein the sixth direct current is used to supply power to the upper bridge arm drive circuit.

10. A motor drive controller, comprising a drive circuit, a control circuit, and a power supply topology, wherein the power supply topology is configured to supply power to the drive circuit and the control circuit, the power supply topology comprises:
a first flyback power supply coupled to a first battery module, the first flyback power supply configured to convert a first direct current output by the first battery module into a second direct current, wherein the second direct current is used to supply power to a lower bridge arm drive circuit in the motor drive controller; and
a first forward power supply, coupled to the first flyback power supply, the first forward power supply configured to convert the second direct current into a third direct current, wherein the third direct current is used to supply power to an upper bridge arm drive circuit.

11. The power supply topology according to claim 10, further comprising:
a power supply management unit coupled to the first flyback power supply or the first battery module, the power supply management unit configured to supply power to a control circuit in the motor drive controller, wherein the control circuit is configured to control the drive circuit.

12. The power supply topology according to claim 10, further comprising:
a second flyback power supply coupled to a second battery module, the second flyback power supply configured to convert a fourth direct current output by the second battery module into a fifth direct current, wherein the fifth direct current is used to supply power to the lower bridge arm drive circuit.

13. The power supply topology according to claim 12, wherein an output end of the first flyback power supply is coupled to the lower bridge arm drive circuit through a first switching transistor, and an output end of the second flyback power supply is coupled to the lower bridge arm drive circuit through a second switching transistor; and the first switching transistor and the second switching transistor are not turned on at the same time.

14. The power supply topology according to claim 12, wherein the power supply management unit is coupled to the second flyback power supply or the second battery module, wherein
the power supply management unit is coupled to the first flyback power supply through a third switching transistor, the power supply management unit is coupled to the second battery module through a fourth switching transistor, and the third switching transistor and the fourth switching transistor are not turned on at the same time; or
the power supply management unit is coupled to the first battery module through a fifth switching transistor, the power supply management unit is coupled to the second flyback power supply through a sixth switching transistor, and the fifth switching transistor and the sixth switching transistor are not turned on at the same time.

15. The power supply topology according to claim 13, wherein the first switching transistor is a diode or a metal-oxide-semiconductor field-effect transistor (MOSFET), and the second switching transistor is a diode or a MOSFET.

16. The power supply topology according to claim 12, wherein the first battery module is a battery and the second battery module is a power battery; or the first battery module is a power battery and the second battery module is a battery.

17. The power supply topology according to claim 10, wherein the motor drive controller is a three-phase motor drive controller or a multi-phase motor drive controller.

18. The power supply topology according to claim 10, further comprising:
a second forward power supply coupled to the first flyback power supply, the second forward power supply configured to convert the second direct current into a sixth direct current, wherein the sixth direct current is used to supply power to the upper bridge arm drive circuit.

19. A vehicle, comprising a power battery, a motor, and a motor drive controller, wherein the motor drive controller is configured to convert a direct current output by the power battery into an alternating current, and the alternating current is used to drive the motor; or
the motor drive controller is configured to convert an alternating current output by the motor into a direct current, and the direct current is used to charge the power battery,
wherein the motor drive controller comprises a drive circuit, a control circuit, and a power supply topology,
wherein the power supply topology is configured to supply power to the drive circuit and the control circuit, and the power supply topology comprises:
a first flyback power supply coupled to a first battery module, the first flyback power supply configured to convert a first direct current output by the first battery module into a second direct current, wherein the second direct current is used to supply power to a lower bridge arm drive circuit in the motor drive controller; and
a first forward power supply coupled to the first flyback power supply, the first forward power supply configured to convert the second direct current into a third direct current, wherein the third direct current is used to supply power to an upper bridge arm drive circuit.

20. The power supply topology according to claim 19, further comprising:
a power supply management unit coupled to the first flyback power supply or the first battery module, the power supply management unit configured to supply power to a control circuit in the motor drive controller, wherein the control circuit is configured to control the drive circuit.

\* \* \* \* \*